UNITED STATES PATENT OFFICE 2,601,323

PROCESS FOR PREPARING 4,4-DIPHENYL-6-DIMETHYLAMINO-HEPTANONE-3

William Bradley Reid, Jr., and Alexander William Schneider, Kalamazoo, Mich., assignors to The Upjohn Company, Kalamazoo, Mich., a corporation of Michigan No Drawing. Application February 2, 1949, Serial No. 74,232

7 Claims. (Cl. 260—570)

This invention relates to an improvement in the synthesis of 4,4-diphenyl-6-dimethylaminoheptanone-3, commonly known as Methadon.

Methadon is an analgesic compound, having many of the therapeutic properties of morphine, and is well known in the medical and pharmaceutical arts. A synthesis of this drug according to the following reaction sequence is described by Kleiderer, Rice, Conquest, and Williams, Office of the Publication Board, Department of Commerce, Report PB 981, at page 97:

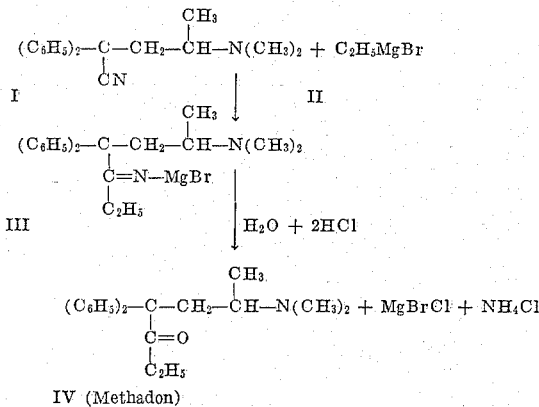

IV (Methadon)

According to the published procedure, 2-dimethylaminopropyl-diphenylacetonitrile (I), in xylene solution, is added to a solution of ethylmagnesium bromide (II) in ether. After heating under reflux, the resulting 2-dimethylaminopropyl - diphenylacetonitrile - ethylmagnesiumbromide complex (III) is hydrolyzed by pouring the suspension into dilute hydrochloric acid. The yield of 4,4 - diphenyl - 6 - dimethylaminoheptanone-3 (IV), or Methadon, attainable as a result of this procedure is about 45 percent of the theoretical, based on the starting nitrile. To the best of our knowledge, there has been available no procedure, by which a higher yield has been obtainable, prior to the present invention.

It is an object of this invention to provide an improved method for the synthesis of Methadon. It is a further object of this invention to provide a procedure whereby the yield of Methadon, which can be obtained from a given quantity of dimethylaminopropyl-diphenylacetonitrile, is greatly increased over that obtainable by known methods. Another object of the invention is the provision of a novel method for the production of Methadon which involves, as the hydrolysis step in the process of producing Methadon from 2-dimethylaminopropyl-diphenylacetonitrile via the ethyl-magnesiumhalide complex, the addition of the dilute hydrolyzing acid to the hot 2-dimethylaminopropyl - diphenylacetonitrile - ethylmagnesiumhalide complex, instead of the reverse order of addition utilized by the prior art. Other objects of the invention will become apparent hereinafter.

The foregoing and additional objects of the invention are accomplished by the hydrolysis of the 2-dimethylaminopropyl-diphenylacetonitrile-ethylmagnesiumhalide complex (III), hereinafter referred to as the nitrile-magnesiumhalide complex, by the addition of dilute acid to the nitrile-magnesiumhalide complex. This reversal of the customary procedure for the hydrolysis of nitrile-magnesiumhalide complexes allows the recovery of Methadon, in a highly purified state, in yields of from 80 to 90 percent of the theoretical, based on the starting nitrile, which is approximately twice the yield obtainable by the best known prior art process.

In carrying out the method of the present invention, a solution of the nitrile (I) in xylene or other inert organic solvent having about the same boiling point, is added to an ethyl magnesium halide, selected from the bromide, chloride, and iodide, which is dissolved in ether. The ethyl magnesium halide employed is in excess of that amount theoretically required to react with the nitrile. Completion of the reaction is accomplished by heating under reflux for several hours after all of the reactants have been mixed together, or by distillation of reaction solvent or solvents, e. g., the ether, until the temperature of the reaction mixture reaches 70 to 90 degrees centigrade, preferably 80 to 85 degrees centigrade, and then heating the mixture under reflux for an additional period, e. g., three to eight hours. During this distillation most of the ether is removed, the remaining reaction solvent being largely xylene. Since this step of solvent removal offers certain advantages with regard to safety during the subsequent hydrolysis step, the removal of ether during the completion of the Grignard reaction is a preferred procedure, but other procedures known in the art for preparing a nitrile-magnesiumhalide complex are satisfactory and may also be used. The presence or absence of solvent during the hydrolysis of the nitrile-magnesiumhalide complex is not critical in the method of the present invention as will be seen from the examples, in which excellent yields are reported from hydrolysis both in the presence and in the absence of solvent.

The condensers, previously arranged for reflux, are at this point set for distillation, and the hydrolysis of the nitrile-magnesium complex accomplished by the addition of an excess of dilute mineral acid, e. g., hydrochloric, hydrobromic, sulfuric, preferably dilute hydrochloric acid, to the hot reaction product, i. e., the nitrile-magnesiumhalide complex. A vigorous reaction ensues, all of the reaction solvent distilling during the addition of the first portions of the acid. When about one-half of the required acid has been added, the mixture usually becomes semisolid, but the addition of the remainder of the acid results in a slurry which can readily be removed from the reaction container. The exact amount of dilute acid used is not critical, an excess of from 0.22 to 13.0 moles over that required to decompose the excess ethyl magnesium halide, react with the nitrile-magnesium-halide complex, and form the hydrochloride of Methadon, having been found equally effective. The hot hydrolysis slurry is then cooled and the Methadon hydrochloride which separates converted to the free base by conventional procedure, e. g., by dissolving the hydrochloride in water and adding an alkali. The free base, which usually separates as a single oily layer, solidifies on cooling the solution, and may be collected for further purification. The process of the present invention thus offers an additional advantage at this point, in that the usual prior art formation of three layers and the resulting difficulty in separating the Methadon hydrochloride therefrom, is ordinarily obviated.

It is to be noted that the hydrolysis step of the present invention, for most advantageous results, is to be carried out without cooling of the nitrile-magnesiumhalide complex during the hydrolysis step. Also, the reaction solvents and hydrolysis solution are preferably allowed to distill freely from the reaction mixture.

The free base, after isolation, may be purified by crystallization from methanol or aqueous methyl alcohol. The yields of recrystallized product of acceptable melting point obtained by the process of this invention are between about 80 and 90 percent of the theoretical, as compared with yields of about 45 percent obtained by previously known procedures, and this increase is obviously of great practical significance. This important increase was entirely unpredictable and unexpected to us, especially since it is known that reversal of the order of addition of reactants in the hydrolysis of a Grignard complex serves no useful purpose, the yields, on either order of addition, remaining about the same.

The present invention is not concerned with the apparatus employed or with the product obtained, but is concerned solely with the novel process whereby the increased yields of Methadon are procured. The following examples are given to illustrate the practice of the present invention, but are in no way to be construed as limiting.

*Example 1.—Prior art: Hydrolysis after ether removal*

A solution of 241 grams of 2-dimethylaminopropyl-diphenyl-acetonitrile in 350 milliliters of dry xylene was added to a solution of ethyl magnesium bromide (prepared from 44 grams of magnesium and 260 grams of ethyl bromide) in 600 milliliters of dry ether, and the mixture heated under reflux for seven hours after addition was complete. Solvent was then distilled until the temperature of the reaction mixture rose to about 87 degrees centigrade. The mixture, while still hot, was poured into a solution of one liter of water and 400 milliliters of concentrated hydrochloric acid (37.5 percent), whereupon a vigorous reaction resulted, vaporizing a part of the reaction solvent. Five hundred milliliters of benzene was then added to the residue, resulting in the separation of three layers. The desired Methadon hydrochloride crystallized from the oily middle layer after standing for several hours. The crystals were collected, washed with 100 milliliters of dilute hydrochloric acid, and then with 100 milliliters of benzene. The air-dried product was dissolved in water, the solution made basic with sodium hydroxide, the oil which separated crystallized, and the solid product collected. When recrystallized from methanol, 122 grams of Methadon, melting at 76–78 degrees centigrade, was obtained, representing 46 percent of the theoretical yield.

*Example 2.—Hydrolysis with 2 molar excess of HCl subsequent to solvent removal*

A solution of 421 grams of 2-dimethylaminopropyl-diphenylacetonitrile (melting point 85–89 degrees centigrade) in 700 milliliters of xylene was added to a solution of ethyl magnesium bromide in 1500 milliliters of ether (prepared from 93 grams of magnesium and 484 grams of ethyl bromide). After the xylene solution had been added, ether was removed by distillation until the temperature attained in the reaction mixture was about 82 degrees centigrade, whereafter the mixture was heated under reflux for an additional five hours. The apparatus was then arranged for distillation, and a mixture of 720 milliliters of 36 percent hydrochloric acid and 900 milliliters of water added to the hot reaction mixture over a period of thirty minutes. A vigorous reaction occurred, the xylene and some acid distilling from the reaction mixture, which became almost solid during the addition but existed as a thin slurry when all of the acid had been added. The slurry was removed from the reaction container, cooled to fifteen degrees centigrade, and filtered. The filter cake was suspended in 1250 milliliters of water, which had been heated to ninety degrees centigrade and made alkaline to a pH of 8 by addition of 140 grams of sodium bicarbonate and forty grams of sodium hydroxide contained in 500 milliliters of water. The free Methadon base separated from the hot alkaline solution as an oil which solidified upon cooling the solution to about five degrees centigrade and stirring. The crude Methadon base, thus obtained, weighed 425 grams when dried, and melted at 73–76.5 degrees centigrade. Crystallization from 600 milliliters of methanol gave 400 grams of white crystalline Methadon, melting at 78.5–79 degrees centigrade, representing 85 percent of the theoretical yield.

*Example 3.—Hydrolysis with 13.0 molar excess of hydrochloric acid after solvent removal*

A ten-gallon still, equipped with a dropping funnel, condenser, stirrer, and drying tubes, was charged with a solution of ethyl magnesium bromide (prepared from 1.8 pounds of magnesium and 7.8 pounds of ethyl bromide) in thirteen liters of dry ether. A solution of 4.2 kilograms of 2-dimethylaminopropyl-diphenylacetonitrile in eight liters of hot anhydrous xylene was added over a period of fifteen minutes. Solvent was distilled from the reaction vessel until the temperature of the reaction mixture rose to 70–80 degrees centigrade, and the mixture heated under reflux for an additional 4.25 hours.

The condenser was then arranged for distillation, and a solution consisting of 6.5 liters of concentrated hydrochloric acid (37.5 percent) and 6.5 liters of water was added to the hot reaction mixture over a period of ten minutes, all of the remaining solvent distilling during this addition. The hot suspension was drawn off and the vessel rinsed with two liters of eighteen percent hydrochloric acid. The crude crystalline Methadon hydrochloride, which crystallized upon cooling the combined acid solutions, was collected, dissolved in 24 liters of boiling water containing 200 grams of activated charcoal, the solution heated to boiling, filtered while hot, and the charcoal residue washed with one liter of boiling water. A solution of 650 grams of sodium hydroxide in one liter of water was added to the combined filtrates. The free Methadon base, which solidified on cooling, was collected, dissolved in ten liters of boiling methanol, the solution filtered to remove a small amount of suspended solid, heated to boiling, and diluted with water until it became slightly turbid. After cooling and stirring the solution, the fine white crystals of Methadon base were collected, washed with 400 milliliters of methanol, and dried in vacuo. The dried Methadon thus obtained weighed 9.4 pounds, melted at 76–78 degrees centigrade, and represented 91.9 percent of the theoretical yield.

*Example 4.—Hydrolysis without prior solvent removal*

A solution of 50.8 grams of 2-dimethylaminopropyldiphenylacetonitrile in forty milliliters of hot anhydrous xylene (ca. 65 degrees centigrade) was added to a stirred solution of ethyl magnesium bromide (prepared from 8.8 grams of magnesium and 44 grams of ethyl bromide) in sixty milliliters of anhydrous ethyl ether, and the mixture thereafter heated under reflux for three hours. The condenser was arranged for distillation, 280 milliliters of ten percent hydrochloric acid added to the mixture, and the organic solvent distilled from the reaction mixture by the heat of the ensuing vigorous reaction. The residue was then transferred to a beaker and 100 milliliters of benzene added, whereupon three layers formed. Upon standing, the Methadon hydrochloride, which crystallized from the oily middle layer, was collected, dried, dissolved in water, the aqueous solution made alkaline with sodium hydroxide, and then cooled. The Methadon separated as a solid and was crystallized from methanol. There was thus obtained 48.8 grams of Methadon, melting at 77–79 degrees centigrade, and representing 85.7 percent of the theoretical yield.

Various modifications may be made in the method of the present invention without departing from the spirit or scope thereof, and it is to be understood that we limit ourselves only as defined in the appended claims.

We claim:

1. In a process for the preparation of a compound selected from the group consisting of 4,4-diphenyl-6-dimethylaminoheptanone-3 and acid addition salts thereof by the hydrolysis of a 2-dimethylaminopropyl-diphenylacetonitrile - ethyl-magnesium-halide complex, wherein the halogen is selected from the group consisting of chlorine, bromine, and iodine, the improvement which comprises: adding an aqueous mineral acid to the 2-dimethylaminopropyl-diphenylacetonitrile - ethyl - magnesium - halide complex without cooling said complex during the said addition.

2. In a process for the preparation of a compound selected from the group consisting of 4,4-diphenyl-6-dimethylaminoheptanone-3 and acid addition salts thereof by the hydrolysis of a 2-dimethylaminopropyl-diphenylacetonitrile - ethyl-magnesium-halide complex, wherein the halogen is selected from the group consisting of chlorine, bromine, and iodine, the improvement which comprises: adding to the 2-dimethylaminopropyl-diphenylacetonitrile-ethyl - magnesium-halide complex at a temperature between seventy and ninety degrees centigrade, an aqueous mineral acid, without cooling the said complex during the addition.

3. The process of claim 2, wherein the temperature of the complex at the start of the addition, is between 80 and 85 degrees centigrade.

4. In a process for the synthesis of 4,4-diphenyl-6-dimethylamino-heptanone-3 hydrochloride by the hydrolysis of a 2-dimethylaminopropyl - diphenylacetonitrile - ethylmagnesium bromide complex the improvement which comprises: adding to the complex, without cooling during the addition, aqueous hydrochloric acid in an amount in excess of that required both to react with the complex and to form the hydrochloride of 4,4 - diphenyl - 6 - dimethylamino-heptanone-3 and allowing vapors produced by the heat of reaction to distill freely from the reaction mixture.

5. The process of claim 4, wherein the temperature of the complex at the start of the addition of hydrochloric acid is between about 70 and 90 degrees centigrade.

6. The process of claim 4, wherein the temperature of the complex at the start of the addition of hydrochloric acid is between about 80 and 85 degrees centigrade.

7. In a process for the preparation of a compound selected from the group consisting of 4,4-diphenyl-6-dimethylamino-heptanone-3 and acid addition salts thereof by the hydrolysis of a 2-dimethylaminopropyl-diphenylacetonitrile - ethyl-magnesium-halide complex, wherein the halogen is selected from the group consisting of chlorine, bromine, and iodine, the improvement which consists in adding an aqueous mineral acid to the 2-dimethylaminopropyl-diphenylacetonitrile - ethyl - magnesium - halide complex, the temperature of the complex at the start of the addition of acid being above about 70 degrees centigrade.

WILLIAM BRADLEY REID, Jr.
ALEXANDER WILLIAM SCHNEIDER.

REFERENCES CITED

The following references are of record in the file of this patent:

FOREIGN PATENTS

| Number | Country | Date |
| --- | --- | --- |
| 61,463 | Denmark | Oct. 23, 1943 |

OTHER REFERENCES

Blicke et al.: "Abstracts of Papers, 111th Meeting, A. C. S.," (April 1947), pp. 3K, 4K.

Easton et al.: "J. Am. Chem. Soc.," vol. 69, pp. 976–977 (April 1947).

Weygand: "Organic Preparations," (Interscience Publishers, Inc.), N. Y., (1945), pp. 368 and 371.